(12) United States Patent
Wang et al.

(10) Patent No.: US 10,305,125 B2
(45) Date of Patent: May 28, 2019

(54) SYSTEM AND METHOD FOR CONTROLLING FLOW RATE RATIO

(71) Applicant: GENERAL ELECTRIC COMPANY, Schenectady, NY (US)

(72) Inventors: Honggang Wang, ShangHai (CN); Shiguang Li, ShangHai (CN); Andrew Philip Shapiro, Malta, NY (US)

(73) Assignee: General Electric Company, Schenectady, NY (US)

(*) Notice: Subject to any disclaimer, the term of this patent is extended or adjusted under 35 U.S.C. 154(b) by 572 days.

(21) Appl. No.: 14/876,438

(22) Filed: Oct. 6, 2015

(65) Prior Publication Data
US 2016/0104906 A1    Apr. 14, 2016

(30) Foreign Application Priority Data
Oct. 8, 2014    (CN) .......................... 2014 1 0525550

(51) Int. Cl.
*H01M 8/04*    (2016.01)
*H01M 8/06*    (2016.01)
(Continued)

(52) U.S. Cl.
CPC .......... *H01M 8/04753* (2013.01); *G05D 7/06* (2013.01); *G05D 7/0635* (2013.01);
(Continued)

(58) Field of Classification Search
CPC ............ H01M 8/04; H01M 8/02; H01M 8/06; G05D 7/06
See application file for complete search history.

(56) References Cited

U.S. PATENT DOCUMENTS

| 4,768,485 A | 9/1988 | Brandner et al. |
| 5,339,673 A | 8/1994 | Nakagawa et al. |

(Continued)

FOREIGN PATENT DOCUMENTS

| CN | 202687941 U | 1/2013 |
| DE | 102013221406 A1 | 4/2014 |

(Continued)

OTHER PUBLICATIONS

European Search Report and Opinion issued in connection with corresponding EP Application No. 15187115.9 dated Apr. 21, 2016.
(Continued)

*Primary Examiner* — Kenneth J Douyette
(74) *Attorney, Agent, or Firm* — Catherine J. Winter; GPO Global Patent Operation (57) ABSTRACT

A system for controlling a flow rate ratio includes a fuel cell comprising an anode for generating a tail gas and having an inlet and an outlet; a fuel reformer for mixing a fuel with the tail gas from the outlet of the anode to generate a reformed stream which is split into first and second branch streams at a splitting position, the first branch stream returned to the inlet of the anode; a cooler for removing heat from the second branch stream; a bottoming cycle including an external or internal combustion engine driven in response to the cooled second branch stream; a measuring device for measuring differential pressures of two of the main stream, the first branch stream and the second branch stream; and a controlling device for controlling a flow rate ratio of the first branch stream to the main stream in response to the measured differential pressures.

15 Claims, 8 Drawing Sheets

(51) Int. Cl.
*G05D 7/06* (2006.01)
*H01M 8/04746* (2016.01)
*H01M 8/04089* (2016.01)
*H01M 8/0612* (2016.01)
*G05D 11/13* (2006.01)

(52) U.S. Cl.
CPC ......... *G05D 7/0664* (2013.01); *G05D 11/13* (2013.01); *H01M 8/04097* (2013.01); *H01M 8/04761* (2013.01); *H01M 8/0618* (2013.01); *H01M 2250/20* (2013.01); *Y02T 90/32* (2013.01)

(56) References Cited

U.S. PATENT DOCUMENTS

| | | | |
|---|---|---|---|
| 6,309,770 | B1 | 10/2001 | Nagayasu et al. |
| 7,059,363 | B2 | 6/2006 | Sugiyama et al. |
| 7,562,588 | B2 | 7/2009 | Absmeier et al. |
| 8,683,986 | B2 | 4/2014 | Elsässer et al. |
| 9,029,036 | B2 | 5/2015 | Zhang et al. |
| 2003/0143448 | A1* | 7/2003 | Keefer ............... B01D 53/047 429/9 |
| 2004/0214055 | A1* | 10/2004 | Aoyama ............. B60L 11/1885 429/411 |
| 2007/0278161 | A1 | 12/2007 | Shepherd et al. |
| 2010/0269924 | A1 | 10/2010 | Yasuda |
| 2013/0183600 | A1* | 7/2013 | Otsuka ............. H01M 8/04007 429/442 |
| 2014/0060461 | A1 | 3/2014 | Shapiro et al. |

FOREIGN PATENT DOCUMENTS

| | | |
|---|---|---|
| JP | 5669515 A | 6/1981 |
| WO | 2013117810 A1 | 8/2013 |

OTHER PUBLICATIONS

Powell et al., "Demonstration of a highly efficient solid oxide fuel cell power system using adiabatic steam reforming and anode gas recirculation", Journal of Power Sources, ScienceDirect, vol. 205, pp. 377-384, May 1, 2012.

Peters et al., "Pre-reforming of natural gas in solid oxide fuel-cell systems", Journal of Power Sources, ScienceDirect, vol. 86, Issues 1-2, pp. 432-441, Mar. 2000.

* cited by examiner

SYSTEM AND METHOD FOR CONTROLLING FLOW RATE RATIO

BACKGROUND

This disclosure relates generally to high temperature application, and more particularly to a system and a method for controlling a flow rate ratio in a high temperature environment.

In a high temperature environment, when fluid or gas properties are difficult to ascertain (for example, in the case that fluid or gas comprises multi-components) but an accurate flow split is required, it is usually impossible to measure flow rate of individual splitting flows by using flow meters, which results from complex fluid or gas properties. Because under the high temperature environment, a density of fluid or gas having complex properties depends on its temperature, pressure and composition, and the changes of fluid or gas on its temperature, pressure and composition in turn have an important influence on a flow rate of fluid or gas. So it is difficult to determine a flow rate ratio in such a circumstance.

For example, in a high temperature fuel cell system, especially hybrid system with gas turbine, or gas engine, fast load transition and optimization of system efficiency are one key issue. A traditional way of controlling a recycle flow rate in the high temperature hybrid fuel cell system is generally by adjusting a gas driving device of the system, such as a blower or a compressor. However, it is slow due to the redistribution of pressure in a recycle loop of the high temperature hybrid fuel cell system. Furthermore, the fluctuation of differential pressure at an anode inlet of a fuel cell may affect durability and even its lifetime of the fuel cell, and the recycle flow rate may affect fuel utilization of the fuel cell and even the system efficiency. But in operation of the conventional high temperature fuel cell hybrid system, the differential pressure at the anode inlet of the fuel cell and the recycle flow rate cannot be controlled separately, due to lack of real time measurement and control of recycle flow rate ratio.

BRIEF DESCRIPTION

In one aspect of embodiments of the present invention, a system for controlling a flow rate ratio is provided. The system for controlling the flow rate ratio comprises: an upstream device for generating a main stream, wherein the main stream is split into a first branch stream and a second branch stream at a splitting position; a first downstream device to which the first branch stream is diverted, wherein both the upstream device and the first downstream device operate at a high temperature which is larger than 300° C.; a second downstream device to which the second branch stream is diverted; a measuring device for measuring differential pressures of two of the main stream, the first branch stream and the second branch stream; and a controlling device for controlling a flow rate ratio of the first branch stream to the main stream in real time in response to the measured differential pressures.

In another aspect of embodiments of the present invention, a method for controlling a flow rate ratio using the above system is also provided. The method for controlling the flow rate ratio comprises: a1) measuring real time differential pressures of two of the main stream, the first branch stream and the second branch stream; a2) calculating a flow rate ratio of the first branch stream to the main stream in real time with the measured differential pressures; a3) comparing the calculated flow rate ratio to a user-defined target flow rate ratio; and a4) controlling a flow rate of at least one of the first branch stream and the second branch stream in real time with the compared result.

In still another aspect of embodiments of the present invention, a system for controlling a recycle flow rate ratio is also provided. The system for controlling the recycle flow rate ratio comprises: a fuel cell comprising an anode for generating a tail gas, the anode comprising an inlet and an outlet; a fuel reformer for mixing a fuel with the tail gas from the outlet of the fuel cell to generate a reformed stream, wherein the reformed stream is split into a first branch stream and a second branch stream at a splitting position, and the first branch stream is returned to the inlet of the anode of the fuel cell for power generation; a cooler for removing heat from the second branch stream; a bottoming cycle including an external or internal combustion engine driven in response to the cooled second branch stream; a measuring device for measuring differential pressures of two of the main stream, the first branch stream and the second branch stream; and a controlling device for controlling a flow rate ratio of the first branch stream to the main stream in real time in response to the measured differential pressures.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described hereinbelow with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items.

Figure 1:
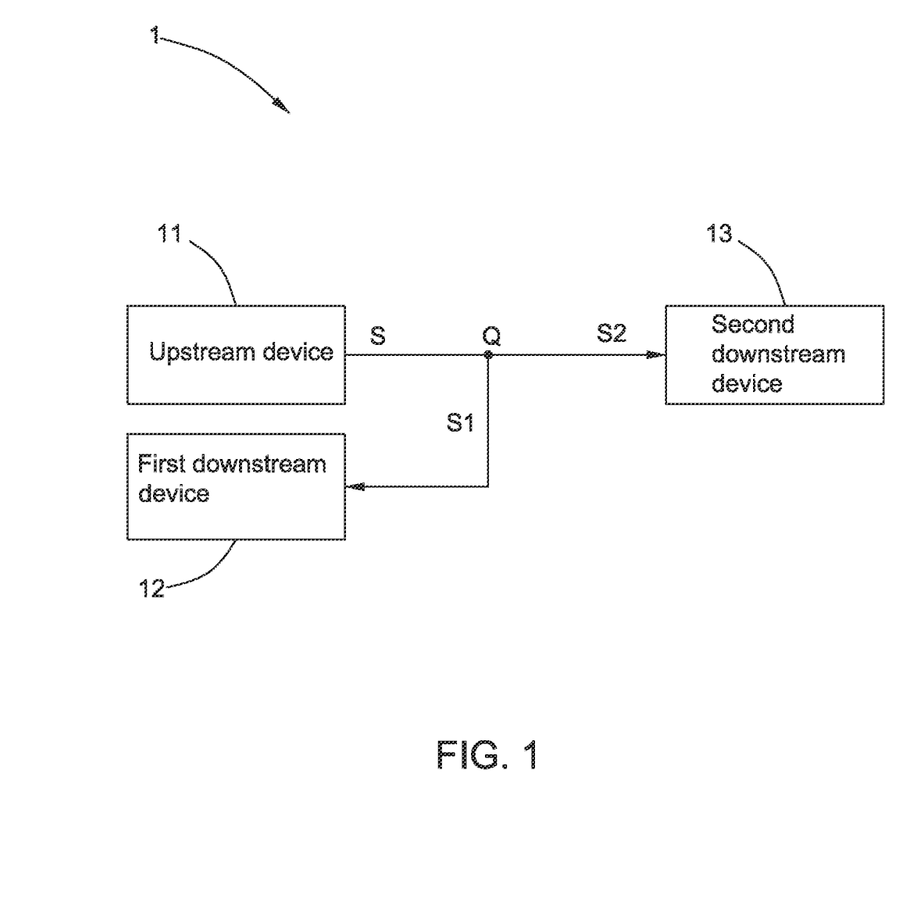
FIG. 1 is a schematic block diagram of a high temperature system.

FIG. 1 illustrates a schematic block diagram of an embodiment of a high temperature system. As shown in FIG. 1, the high temperature system 1 according to the embodiment includes an upstream device 11, a first downstream device 12 and a second downstream device 13. Both the upstream device 11 and the first downstream device 12 operate at a high temperature which is larger than 300° C. The upstream device 11 generates a main stream S which is split into a first branch stream S1 and a second branch stream S2 at a splitting position Q. The main stream S has complex fluid or gas properties, for example, the main stream S can be fluid or gas having multi-components. The first branch stream S1 is diverted to the first downstream device 12 and is correspondingly processed in the first downstream device 12. The second branch stream S2 is diverted to the second downstream device 13 and is correspondingly processed in the second downstream device 13.

In order to measure and control a flow rate ratio RR of the first branch stream S1 to the main stream S in real time in the high temperature system 1, on the basis of components of the high temperature system 1, a system for controlling a flow rate ratio further includes a measuring device and a controlling device (both of which are not shown in FIG. 1). The measuring device measures real time differential pressures $DP_1$, $DP_2$ of two of the main stream S, the first branch stream S1 and the second branch stream S2. The controlling device controls the flow rate ratio RR of the first branch stream S1 to the main stream S in real time in response to the measured differential pressures $DP_1$, $DP_2$.

Figure 7:
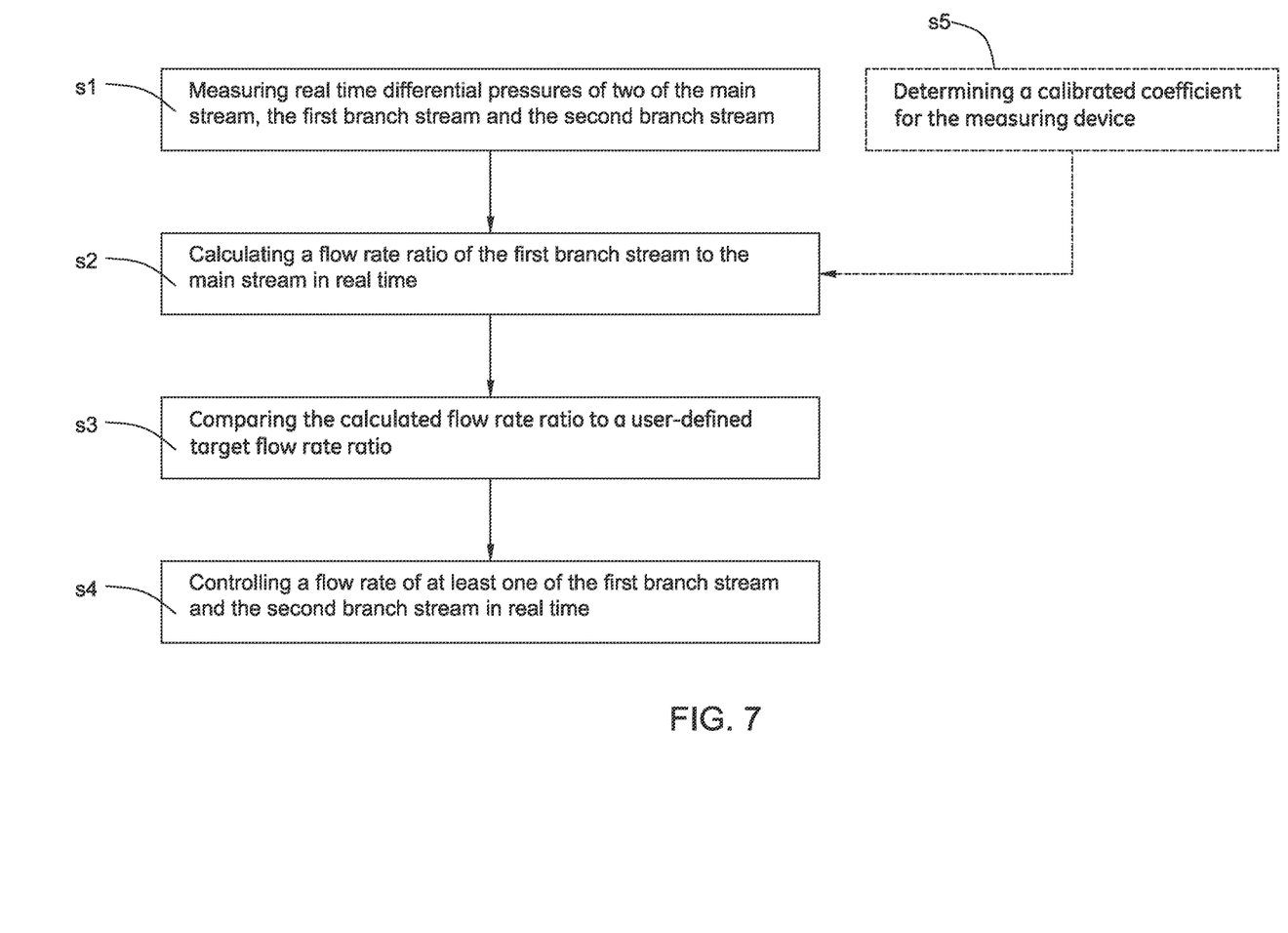
FIG. 7 is a flowchart of a method for controlling a flow rate ratio in accordance with an embodiment of the present invention.

FIG. 7 illustrates a flowchart of a method for controlling a flow rate ratio using the above system in accordance with an embodiment of the present invention. As shown in FIG. 7, a method for controlling a flow rate ratio using the above system in accordance with an embodiment of the present invention comprises the steps as following:

At block s1, real time differential pressures $DP_1$, $DP_2$ of two of the main stream S, the first branch stream S1 and the second branch stream S2 in the above system are measured.

At block s2, a flow rate ratio RR of the first branch stream S1 to the main stream S is calculated in real time with the measured differential pressures $DP_1$, $DP_2$.

At block s3, the calculated flow rate ratio RR is compared to a user-defined target flow rate ratio.

At block s4, a flow rate of at least one of the first branch stream S1 and the second branch stream S2 in real time is controlled with the compared result.

In one embodiment, as shown in FIG. 7, the method for controlling the flow rate ratio further comprises the step as following:

At block s5, a calibrated coefficient K for the measuring device 34 is determined in advance. Therefore, at block s2, a flow rate ratio RR of the first branch stream S1 to the main stream S in real time is calculated with the measured differential pressures $DP_1$, $DP_2$ and the calibrated coefficient K.

Figure 2:
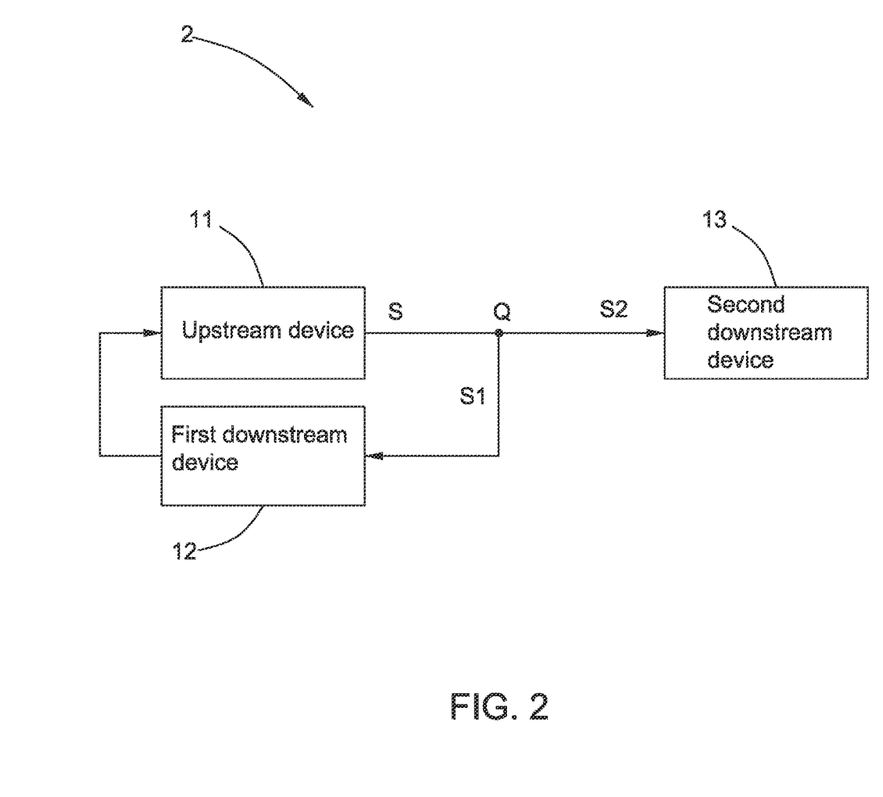
FIG. 2 is a schematic block diagram of a high temperature recycle system.

As an example, the high temperature system 1 can be a high temperature recycle system. FIG. 2 illustrates a schematic block diagram of an embodiment of a high temperature recycle system. As shown in FIG. 2, similar to the high temperature system 1 of FIG. 1, the high temperature recycle system 2 according to the embodiment includes an upstream device 11, a first downstream device 12 and a second downstream device 13. Both the upstream device 11 and the first downstream device 12 operate at a high temperature which is larger than 300° C. The upstream device 11 generates a main stream S which is split into a first branch stream S1 and a second branch stream S2 at a splitting position Q. The main stream S has complex fluid or gas properties, for example, the main stream S can be fluid or gas having multi-components. The first branch stream S1 is diverted to the first downstream device 12 and is correspondingly processed in the first downstream device 12. The second branch stream S2 is diverted to the second downstream device 13 and is correspondingly processed in the second downstream device 13.

However, referring to FIG. 2, different from the high temperature system 1 of FIG. 1, in the high temperature recycle system 2 of FIG. 2, at least part of the first branch stream S1 is returned to the upstream device 11 for processing after the first branch stream S1 is passed through the first downstream device 12, and a flow rate ratio RR of the first branch stream S1 to the main stream S is a recycle flow rate ratio RR of the first branch stream S1 to the main stream S.

Similar to the high temperature system 1 of FIG. 1, in order to measure and control the recycle flow rate ratio RR in real time in the high temperature recycle system 2, on the basis of components of the high temperature recycle system 2, a system for controlling a flow rate ratio further includes a measuring device and a controlling device (both of which are not shown in FIG. 2). The measuring device measures real time differential pressures $DP_1$, $DP_2$ of two of the main stream S, the first branch stream S1 and the second branch stream S2. The controlling device controls the recycle flow rate ratio RR in real time in response to the measured differential pressures $DP_1$, $DP_2$.

A high temperature fuel cell system will be hereinafter taken as an example of a high temperature system for purpose to describe a system and a method for controlling a flow rate ratio in detail.

Figure 3:
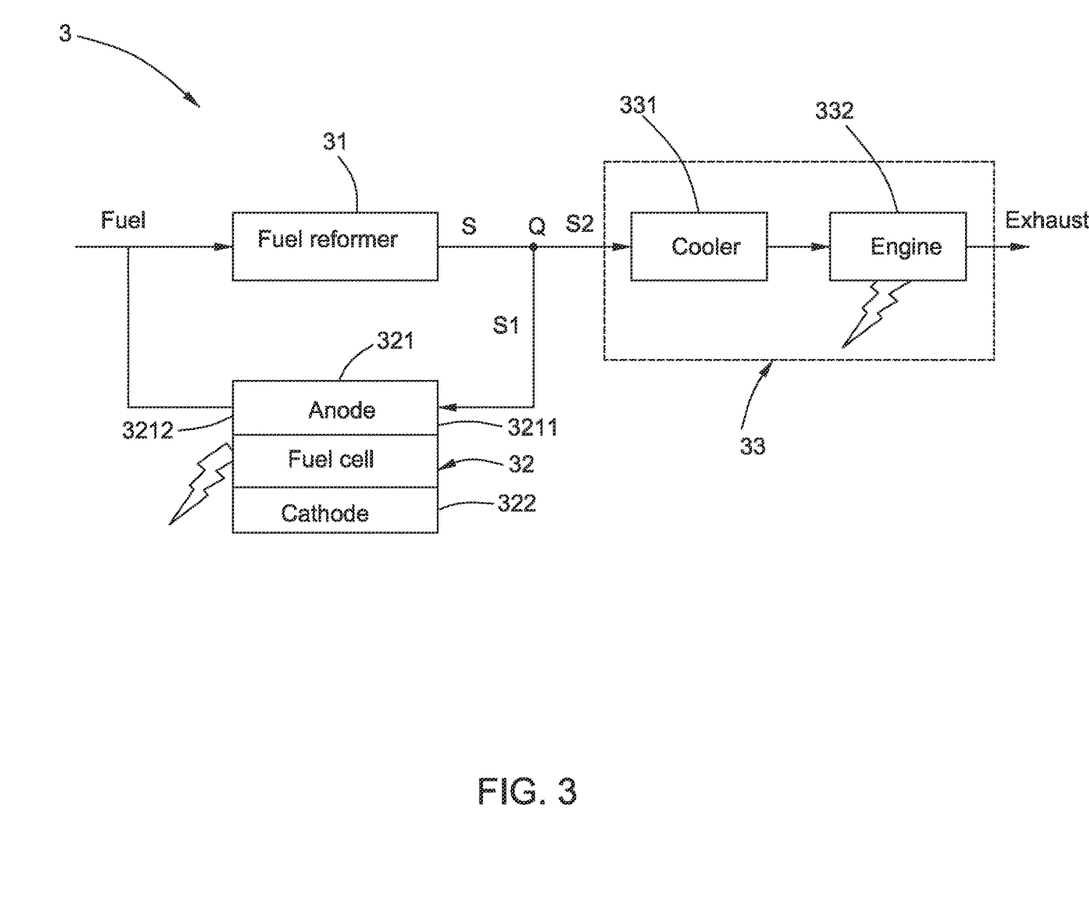
FIG. 3 is a schematic block diagram of a high temperature fuel cell system in accordance with an embodiment.

FIG. 3 illustrates a schematic block diagram of a high temperature fuel cell system of an embodiment. As shown in FIG. 3, the high temperature fuel cell system 3 according to an embodiment includes a fuel reformer 31, a fuel cell 32, a cooler 331 and a bottoming cycle including an external or internal combustion engine 332. The fuel cell 32 which is for example a solid oxide fuel cell (SOFC) includes an anode 321 for electrochemically oxidizing fuel and a cathode 322 for electrochemically reducing oxygen. The anode 321 includes an inlet 3211 and an outlet 3212.

With reference to FIG. 3, a splitting position Q is located in an outlet of the fuel reformer 31. The fuel reformer 31 mixes a fuel with a tail gas generated from the outlet 3212 of the anode 321 of the fuel cell 32 and the fuel and the tail gas are reformed in the fuel reformer 32 to generate a reformed stream S as the main stream. The fuel can be for example biogas, natural gas, liquefied petroleum gas, methane, ethane, propane, methanol, ethanol, syngas, and other hydrocarbon fuels. In the fuel reformer 31, the hydrocarbon fuel is reformed into hydrogen ($H_2$) and carbon monoxide (CO) by reforming reaction and at the same time, carbon monoxide and steam ($H_2O$) is also transformed into carbon dioxide ($CO_2$) and hydrogen by transformation reaction. The reformed stream S includes multi-components, for example, the reformed stream S has mixed gas composition of hydrogen, carbon monoxide, carbon dioxide, methane ($CH_4$), steam and etc. The reformed stream S is split into a first branch stream S1 and a second branch stream S2 at the splitting position Q. The first branch stream S1 is diverted to the inlet 3211 of the anode 321 of the fuel cell 32 for high efficient power generation. In an embodiment, the fuel cell 32 converts hydrogen and oxygen into water to produce electricity and heat. The byproduct water may exit from the outlet 3212 of the fuel cell 32 as steam in high temperature operations. The second branch stream S2 is diverted to the cooler 331. The cooler 331 removes heat from the second branch stream S2, and the external or internal combustion engine 332 is driven to generate additional electricity for providing increased efficiency of power generation in response to the cooled second branch stream, and the redundant portion is discharged as an exhaust from the external or internal combustion engine 332. In an embodiment, the steam reforming reaction of hydrocarbons in the fuel reformer 31 is endothermic, and therefore, the reforming may utilize the heat generated by the typically exothermic electrochemical reactions of the fuel cell 32.

In the high temperature fuel cell system 3 of FIG. 3, the fuel reformer 31 acts as the upstream device, while the fuel cell 32 acts as the first downstream device, and the cooler 331 and the bottoming cycle including the external or internal combustion engine 332 together act as the second downstream device 33.

Figure 4:
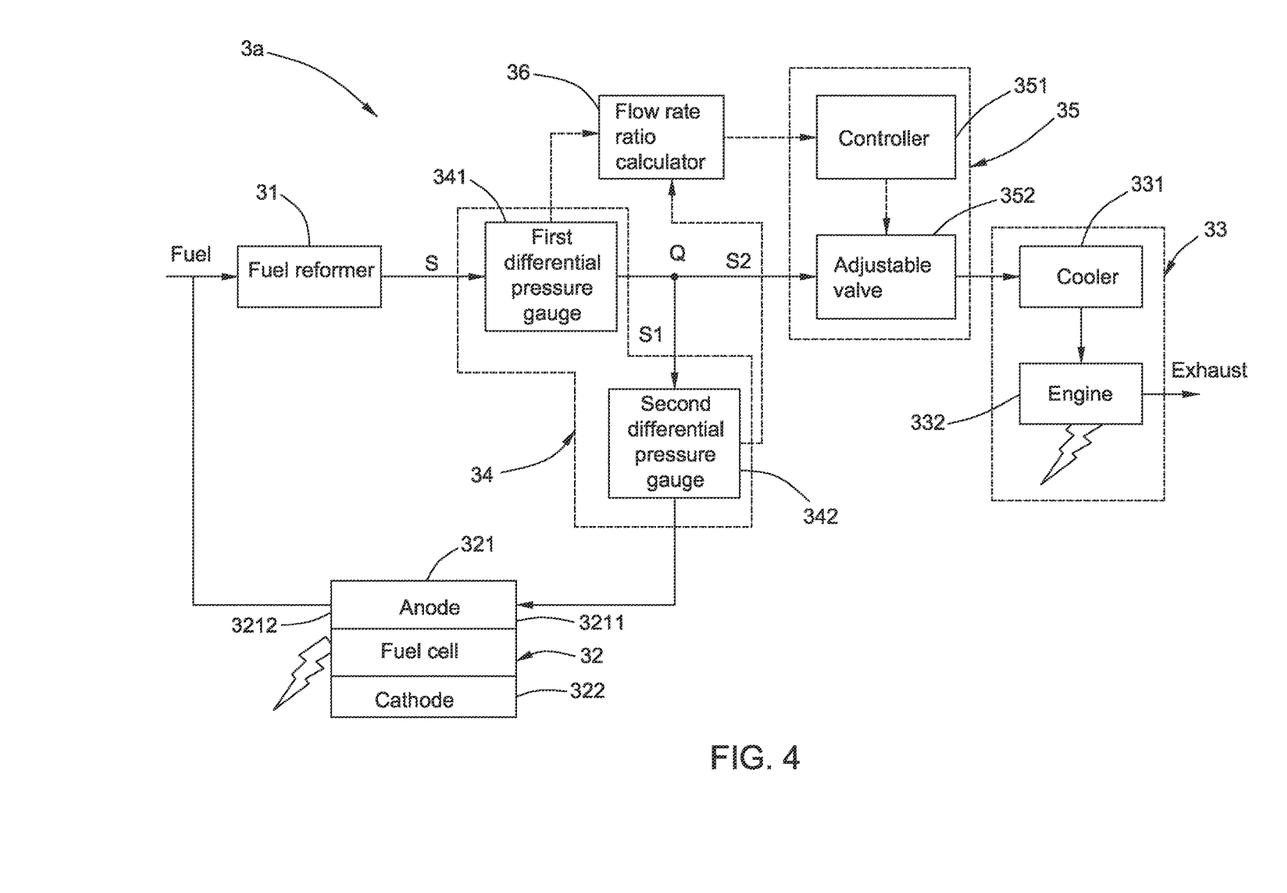
FIG. 4 is a schematic block diagram of a system for controlling a flow rate ratio based on FIG. 3 in accordance with a first embodiment of the present invention.

FIG. 4 illustrates a schematic block diagram of a system for controlling a flow rate ratio based on FIG. 3 in accordance with a first embodiment of the present invention. As shown in FIG. 4, on the basis of components of the high temperature fuel cell system 3 of FIG. 3, a system 3a for controlling a flow rate ratio according to a first embodiment of the present invention further includes a measuring device 34 and a controlling device 35. The measuring device 34 measures differential pressures of two of the main stream S, the first branch stream S1 and the second branch stream S2. The controlling device 35 controls a flow rate ratio of the first branch stream S1 to the main stream S in real time in response to the measured differential pressures. The measuring device 34 includes first and second differential pressure gauges 341, 342 which are the same and are both placed close to the splitting position Q. In one embodiment, the first and second differential pressure gauges 341, 342 may be orifices. In another embodiment, the first and second differential pressure gauges 341, 342 may be also venturi meters. The first differential pressure gauge 341 is located between the fuel reformer 31 as the upstream device and the splitting position Q for measuring a differential pressure $DP_1$ of the main stream S, and the second differential pressure gauge 342 is located between the fuel cell 32 as the first downstream device and the splitting position Q for measuring a differential pressure $DP_2$ of the first branch stream S1.

With reference to FIG. 4, the system 3a for controlling the flow rate ratio further includes a flow rate ratio calculator 36. A calibrated coefficient K for the measuring device 34 (that is, a calibrated coefficient K for the second differential pressure gauge 342 relative to the first differential pressure gauge 341) is pre-stored in the flow rate ratio calculator 36. The flow rate ratio calculator 36 calculates the flow rate ratio based on the measured differential pressures and the calibrated coefficient.

Figure 8:
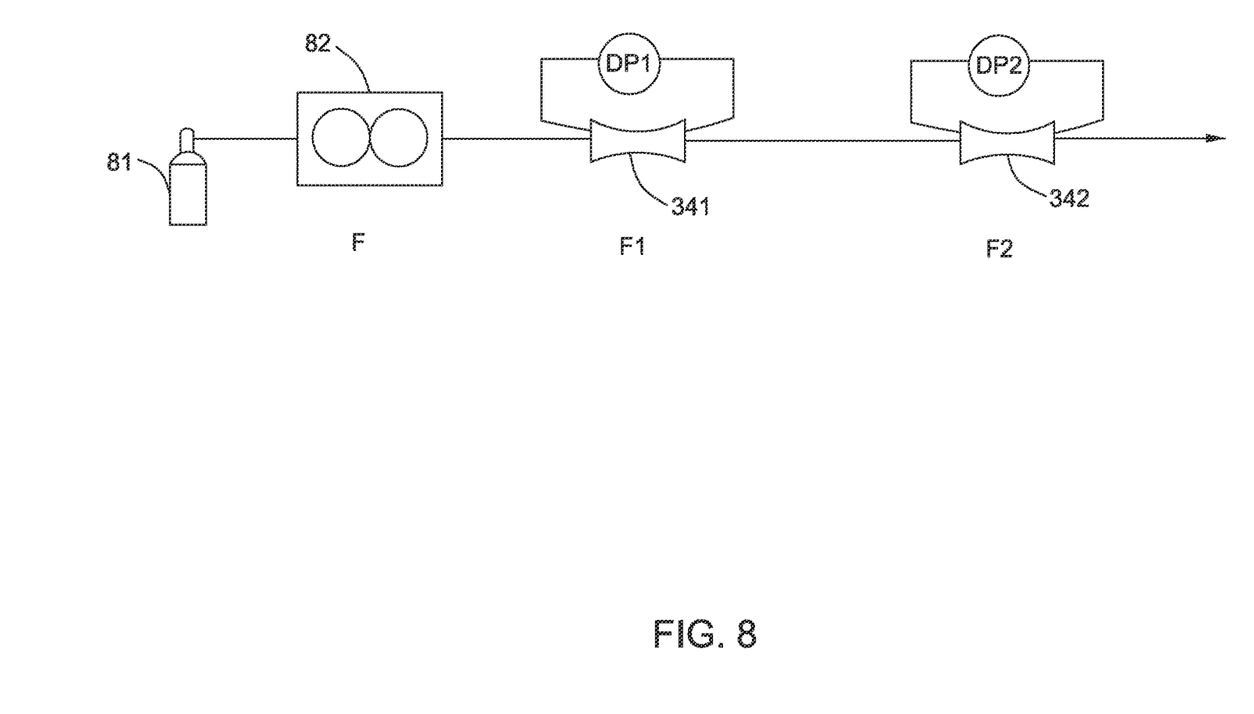
FIG. 8 is a schematic diagram used in determining a calibrated coefficient for a measuring device of the present invention.

FIG. 8 illustrates a schematic diagram used in determining the calibrated coefficient K for the measuring device 34. As shown in FIG. 8, a variable gas source 81 is firstly prepared. The variable gas source 81 is connected to a mass flow rate controller 82, and the mass flow rate controller 82 is then connected with the first and the second differential pressure gauges 341, 342 of the measuring device 34. Gas flow rate of the mass flow rate controller 82 is changed and then, first and second differential pressure values $DP_{c1}$, $DP_{c2}$ of the first and the second differential pressure gauges 341, 342 are recorded respectively. Finally, the calibrated coefficient K for the measuring device 33 is determined using the following equations:

$$F1 = \frac{K_1\sqrt{DP_{c1}}}{\rho_c} \quad (1)$$

$$F2 = \frac{K_2\sqrt{DP_{c2}}}{\rho_c} \quad (2)$$

$$F = F1 = F2 \quad (3)$$

$$K = \frac{K_2}{K_1} \quad (4)$$

Wherein F represents the gas flow rate of the mass flow rate controller 82, F1 and F2 respectively represent gas flow rate of the first and the second pressure gauges 341 and 342, $K_1$ and $K_2$ respectively represent first and second coefficients of the first and the second differential pressure gauges 341 and 342, and $\rho_c$ represents a gas density of the variable gas source 81.

The flow rate ratio RR of the first branch stream S1 to the main stream S is calculated using the following equations:

$$RR = \frac{F_{S1}}{F_S} \quad (5)$$

$$F_{S1} = \frac{K_2\sqrt{DP_2}}{\rho_1} \quad (6)$$

$$F_S = \frac{K_1\sqrt{DP_1}}{\rho} \quad (7)$$

$$\rho = \rho_1 \quad (8)$$

Wherein $\rho_1$ represents a density of the first branch stream S1 and $\rho$ represents a density of the main stream S.

From the equations (5)-(8), the flow rate ratio RR of the first branch stream S1 to the main stream S may be obtained as following:

$$RR = \frac{K_2}{K_1} \times \frac{\sqrt{DP_2}}{\sqrt{DP_1}} = K \times \frac{\sqrt{DP_2}}{\sqrt{DP_1}} \quad (9)$$

The controlling device 35 includes a controller 351 and an adjustable valve 352 for adjusting a flow rate. The controller 351 receives the flow rate ratio RR calculated from the flow rate ratio calculator 36, compares the calculated flow rate ratio RR to a user-defined target flow rate ratio and controls an opening position of the adjustable valve 352 based on the compared result. In detail, the controller 351 sends out a control signal to the adjustable valve 352 based on an error between the target flow rate ratio and the calculated flow rate ratio RR, and the adjustable valve 352 receives the control signal from the controller 351 and adjusts its opening position to control a flow rate of at least one of the first branch stream S1 and the second branch stream S2. In one embodiment, as shown in FIG. 4, the adjustable valve 352 is arranged between the splitting position Q and the second downstream device 33 for adjusting a flow rate of the second branch stream S2. The adjustable valve 352 is not limited to such an arrangement, for example, in another embodiment, the adjustable valve 352 may be also a three-way valve which is arranged at the splitting position Q for adjusting flow rates of the first and the second branch streams S1, S2.

Figure 5:
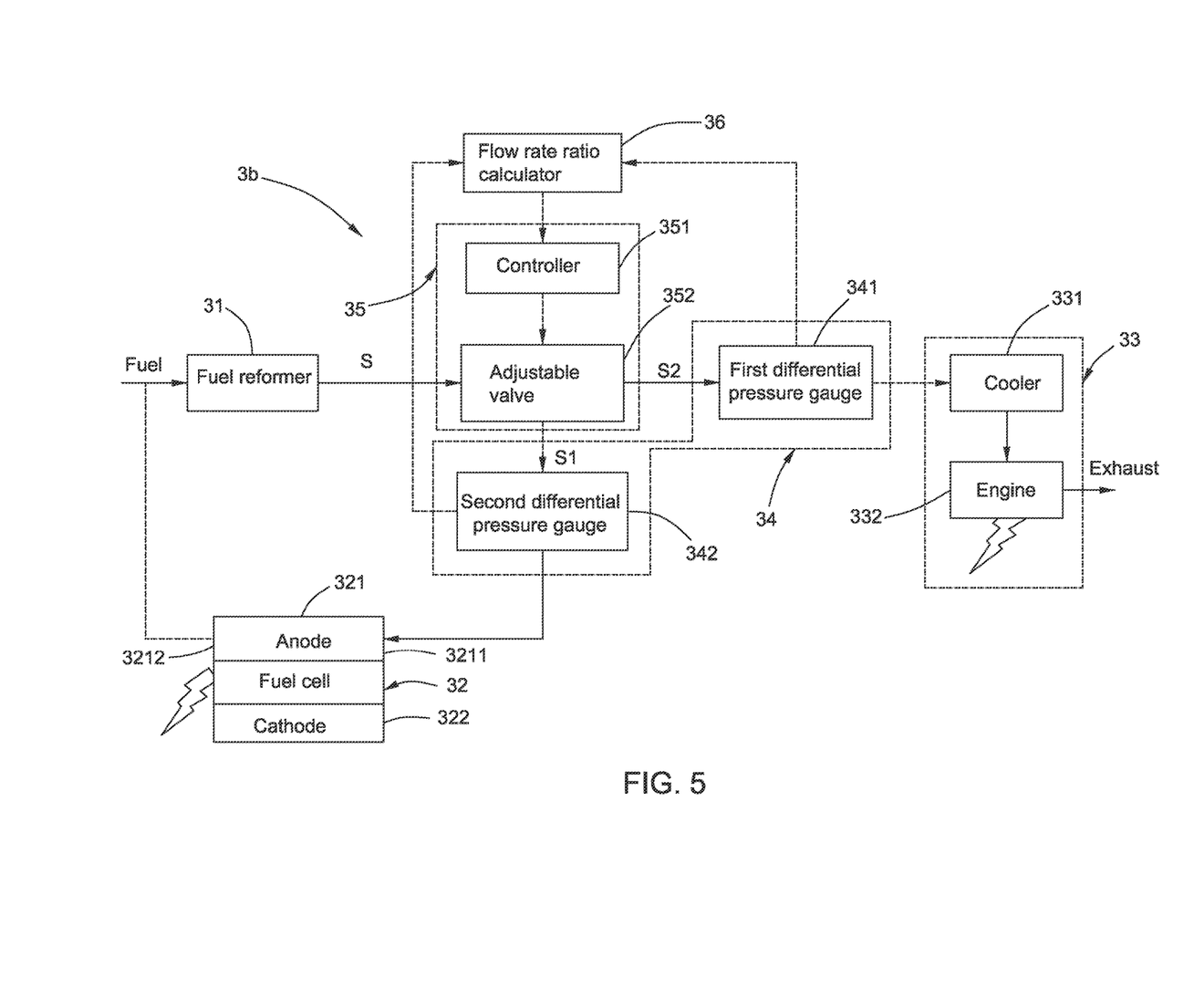
FIG. 5 is a schematic block diagram of a system for controlling a flow rate ratio based on FIG. 3 in accordance with a second embodiment of the present invention.

FIG. 5 illustrates a schematic block diagram of a system for controlling a flow rate ratio based on FIG. 3 in accordance with a second embodiment of the present invention. As shown in FIG. 5, on the basis of components of the high temperature fuel cell system 3 of FIG. 3, a system 3b for controlling a flow rate ratio according to a second embodiment of the present invention further includes a measuring device 34 and a controlling device 35. The measuring device 34 measures differential pressures of two of the main stream S, the first branch stream S1 and the second branch stream S2. The controlling device 35 controls a flow rate ratio of the first branch stream S1 to the main stream S in real time in response to the measured differential pressures. The measuring device 34 includes first and second differential pressure gauges 341, 342 which are the same and are both placed close to the splitting position Q. In one embodiment, the first and second differential pressure gauges 341, 342 may be orifices. In another embodiment, the first and second differential pressure gauges 341, 342 may be also venturi meters. The first differential pressure gauge 341 is located between the splitting position Q and the second downstream device 33 for measuring a differential pressure $DP_1$ of the second branch stream S2, and the second differential pressure gauge 342 is located between the fuel cell 32 as the first downstream device and the splitting position Q for measuring a differential pressure $DP_2$ of the first branch stream S1.

With reference to FIG. 5, the system 3b for controlling the flow rate ratio further includes a flow rate ratio calculator 36. A calibrated coefficient K for the measuring device 34 (that is, a calibrated coefficient K for the second differential pressure gauge 342 relative to the first differential pressure gauge 341, as shown in equation (4)) is pre-stored in the flow rate ratio calculator 36. The calibrated coefficient K for the measuring device 34 can be determined by using the above method with reference to FIG. 8. The flow rate ratio calculator 36 calculates the flow rate ratio RR based on the measured differential pressures $DP_1$, $DP_2$ and the calibrated coefficient K.

The flow rate ratio RR of the first branch stream S1 to the main stream S is calculated using the following equations:

$$RR = \frac{F_{S1}}{F_S} = \frac{F_{S1}}{F_{S1} + F_{S2}} \quad (10)$$

$$F_{S1} = \frac{K_2 \sqrt{DP_2}}{\rho_2} \quad (11)$$

$$F_{S2} = \frac{K_1 \sqrt{DP_1}}{\rho_1} \quad (12)$$

$$\rho_1 = \rho_2 \quad (13)$$

Wherein $\rho_2$ represents a density of the first branch stream S1 and $\rho_1$ represents a density of the second branch stream S2.

From the equations (10)-(13), the flow rate ratio RR of the first branch stream S1 to the main stream S may be obtained as following:

$$RR = \frac{1}{1 + \frac{K_1}{K_2} \times \frac{\sqrt{DP_1}}{\sqrt{DP_2}}} = \frac{1}{1 + \frac{1}{K} \times \frac{\sqrt{DP_1}}{\sqrt{DP_2}}} \quad (14)$$

The controlling device 35 includes a controller 351 and an adjustable valve 352 for adjusting a flow rate. The controller 351 receives the flow rate ratio calculated from the flow rate ratio calculator 36, compares the calculated flow rate ratio to a user-defined target flow rate ratio and controls an opening position of the adjustable valve 352 based on the compared result. In detail, the controller 351 sends out a control signal to the adjustable valve 352 based on an error between the target flow rate ratio and the calculated flow rate ratio RR, and the adjustable valve 352 receives the control signal from the controller 351 and adjusts its opening position to control a flow rate of at least one of the first branch stream S1 and the second branch stream S2. In one embodiment, as shown in FIG. 5, the adjustable valve 352 may be a three-way valve which is arranged at the splitting position Q for adjusting flow rates of the first and the second branch streams S1, S2. The adjustable valve 352 is not limited to such an arrangement, for example, in another embodiment, the adjustable valve 352 may be also arranged between the splitting position Q and the second downstream device 33 for adjusting a flow rate of the second branch stream S2.

In the system 3a, 3b for controlling the flow rate ratio of the present invention, such the design of the first and the second differential pressure gauge 341, 342 of the measuring device 34 makes the measurement of the flow rate ratio RR independent of the change of temperature, pressure and composition of the stream, and the complex properties of the stream have no influence on the measurement of the flow rate ratio RR, so the flow rate ratio RR can be accurately measured. Furthermore, the accurate measurement of flow rate ratio RR can optimize system control. The efficiency and lifetime of the fuel cell 32 can be promised, which will increase the total efficiency of the system and reduce the operating cost.

Figure 6:
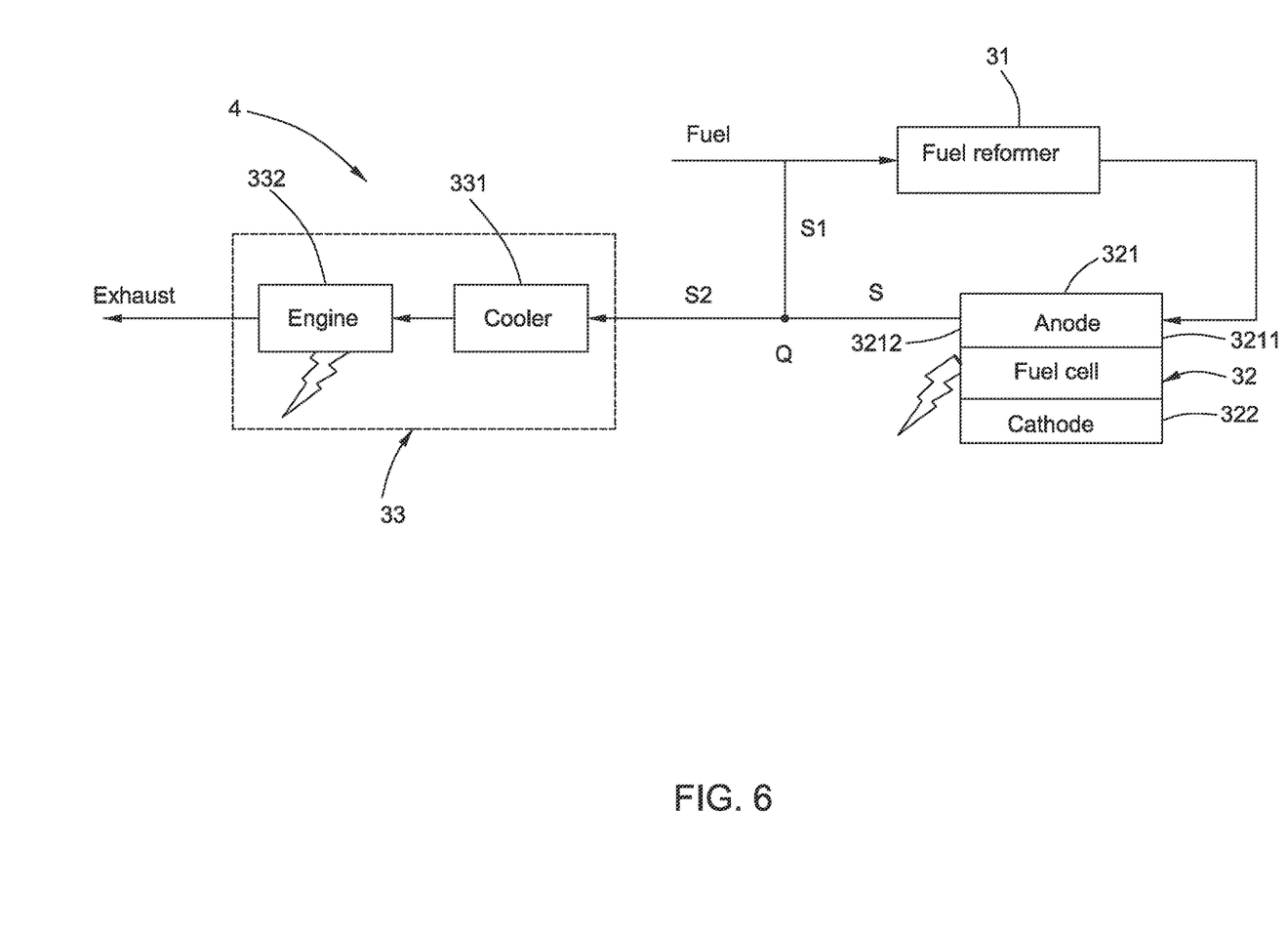
FIG. 6 is a schematic block diagram of a high temperature fuel cell system in accordance with another embodiment.

FIG. 6 illustrates a schematic block diagram of a high temperature fuel cell system of another embodiment. As shown in FIG. 6, similar to the high temperature fuel cell system 3 of FIG. 3, the high temperature fuel cell system 4 according to another embodiment also includes a fuel reformer 31, a fuel cell 32, a cooler 331 and a bottoming cycle including an external or internal combustion engine 332. The fuel cell 32 includes an anode 321 for electrochemically oxidizing fuel and a cathode 322 for electrochemically reducing oxygen. The anode 321 includes an inlet 3211 and an outlet 3212.

However, with reference to FIG. 6, different from the high temperature fuel cell system 3 of FIG. 3, in the high temperature fuel cell system 4 of FIG. 6, a splitting position Q is located in the outlet 3212 of the anode 321 of the fuel cell 32, instead of the outlet of the fuel reformer 31, and a tail gas S generated from the outlet 3212 of the anode 321 of the fuel cell 32 is regarded as the main stream. The tail gas S generated from the outlet 3212 of the anode 321 of the fuel cell 32 is split into a first branch stream S1 and a second branch stream S2 at the splitting position Q. The fuel reformer 31 mixes a fuel with the first branch stream S1 of the tail gas S from the outlet 3212 of the anode 321 of the fuel cell 32 to generate a reformed stream. The reformed stream is then returned to the inlet 3211 of the fuel cell 32 for high efficient power generation. The fuel can be for example biogas, natural gas, liquefied petroleum gas, methane, ethane, propane, methanol, ethanol, syngas, and other hydrocarbon fuels. The second branch stream S2 of the tail gas S is diverted to the cooler 331. The cooler 331 removes heat from the second branch stream S2, and the external or internal combustion engine 332 is driven to generate additional electricity for providing increased efficiency of power generation in response to the cooled second branch stream.

In the high temperature fuel cell system 4 of FIG. 6, the fuel cell 32 acts as the upstream device, while the fuel reformer 31 acts as the first downstream device, and the cooler 331 and the bottoming cycle including the external or internal combustion engine 332 together act as the second downstream device 33.

Arrangements of the measuring device 34 including the first and the second differential pressure gauge 341, 342, the controlling device 35 including the controller 351 and the adjustable valve 352 and the flow rate ratio calculator 36 as shown in FIGS. 4 and 5 and their equivalent alterations can be similarly applied to the high temperature fuel cell system 4 of FIG. 6. Thus, the similar descriptions are omitted herein for purpose to language simplification.

In addition, the system for controlling the flow rate ratio of the present invention is not limited to the systems 3a and 3b of FIGS. 4 and 5, in fact, the system and the method for controlling the flow rate ratio of the present invention can be applied to any proper high temperature system similar to the high temperature system 1 of FIG. 1.

The system and the method for controlling the flow rate ratio of the present invention can eliminate the need of correction for temperature, pressure and composition change of the stream, which has advantage of low pressure drop, low energy cost, fast response, easy maintenance and easier to scale up. The system and the method for controlling the flow rate ratio of the present invention can be applied to any high temperature system wherever fluid or gas properties are difficult to ascertain but an accurate flow split is required and can enable the high temperature system in terms of high energy efficiency, high reliability and flexibility, low operating cost.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A system for controlling a flow rate ratio, comprising:
   an upstream device for generating a main stream, wherein the main stream is split into a first branch stream and a second branch stream at a splitting position;
   a first downstream device to which the first branch stream is diverted, wherein both the upstream device and the first downstream device operate at a high temperature which is larger than 300° C.;
   a second downstream device to which the second branch stream is diverted;
   a measuring device for measuring differential pressures of two of the main stream, the first branch stream and the second branch stream; and
   a controlling device for controlling a flow rate ratio of the first branch stream to the main stream in real time in response to the measured differential pressures, wherein the measuring device comprises first and second differential pressure gauges, the first differential pressure gauge is located between the upstream device and the splitting position for measuring a differential pressure of the main stream, and the second differential pressure gauge is located between the first downstream device and the splitting position for measuring a differential pressure of the first branch stream.

2. The system according to claim 1, wherein the first and second differential pressure gauges are the same.

3. The system of claim 2, further comprising:
   a flow rate ratio calculator in which a calibrated coefficient for the second differential pressure gauge relative to the first differential pressure gauge is pre-stored, and wherein the flow rate ratio calculator is for calculating the flow rate ratio based on the measured differential pressures and the calibrated coefficient.

4. The system of claim 3, wherein the controlling device comprises a controller and an adjustable valve for adjusting a flow rate, the controller is for receiving the flow rate ratio calculated from the flow rate ratio calculator, comparing the calculated flow rate ratio to a user-defined target flow rate ratio and controlling an opening position of the adjustable valve based on the compared result.

5. The system of claim 4, wherein the adjustable valve is arranged between the splitting position and the second downstream device for adjusting a flow rate of the second branch stream, or the adjustable valve is a three-way valve which is arranged at the splitting position for adjusting flow rates of the first and the second branch streams.

6. The system of claim 1, wherein at least part of the first branch stream is returned to the upstream device after the first branch stream is passed through the first downstream device, and the flow rate ratio is a recycle flow rate ratio.

7. The system of claim 6, wherein the first downstream device is a fuel cell comprising an anode for generating a tail gas, the anode comprising an inlet and an outlet, and the upstream device is a fuel reformer for mixing a fuel with the tail gas from the outlet of the fuel cell to generate a reformed stream as the main stream.

8. The system of claim 7, wherein the second downstream device comprises:
   a cooler for removing heat from the second branch stream; and
   a bottoming cycle comprising an external or internal combustion engine driven in response to the cooled second branch stream.

9. The system of claim 6, wherein the upstream device is a fuel cell comprising an anode for generating a tail gas as the main stream, the anode comprising an inlet and an outlet, and the first downstream device is a fuel reformer for mixing a fuel with the first branch stream of the tail gas from the outlet of the fuel cell to generate a reformed stream.

10. A method for controlling a flow rate ratio using a system, which comprises an upstream device for generating a main stream, wherein the main stream is split into a first branch stream and a second branch stream at a splitting position, a first downstream device to which the first branch stream is diverted, wherein both the upstream device and the first downstream device operate at a high temperature which is larger than 300° C. a second downstream device to which the second branch stream is diverted, a measuring device for measuring differential pressures of two of the main stream, the first branch stream and the second branch stream, and a controlling device for controlling a flow rate ratio of the first branch stream to the main stream in real time in response to the measured differential pressures, wherein the measuring device comprises first and second differential pressure gauges, the first differential pressure gauge is located between the upstream device and the splitting position for measuring a differential pressure of the main stream, and the second differential pressure gauge is located between the first downstream device and the splitting position for measuring a differential pressure of the first branch stream, the method comprising:
measuring real time differential pressures of two of the main stream, the first branch stream and the second branch stream;
calculating a flow rate ratio of the first branch stream to the main stream in real time with the measured differential pressures;
comparing the calculated flow rate ratio to a user-defined target flow rate ratio; and
controlling a flow rate of at least one of the first branch stream and the second branch stream in real time with the compared result, wherein measuring real time differential pressures of two of the main stream, the first branch stream and the second branch stream comprises measuring a differential pressure of the main stream using the first differential pressure gauge located between the upstream device and the splitting device and the splitting position and measuring a differential pressure of the first branch stream using the second differential pressure gauge located between the first downstream device and the splitting position.

11. The method according to claim 10, further comprising:
determining a calibrated coefficient for the measuring device in advance; wherein calculating the flow rate ratio of the first branch stream to the main stream in real time with the measured differential pressures comprises calculating a flow rate ratio of the first branch stream to the main stream in real time with the measured differential pressures and the calibrated coefficient.

12. The method according to claim 11, wherein the measuring device comprises first and second differential pressure gauges which are the same, determining the calibrated coefficient for the measuring device in advance comprising:
preparing a variable gas source;
connecting the variable gas source to a mass flow rate controller;
connecting the mass flow rate controller with the first and the second differential pressure gauges;
changing a gas flow rate of the mass flow rate controller;
recording first and second differential pressure values of the first and the second differential pressure gauges respectively; and
determining the calibrated coefficient using the following equations:

$$F = \frac{K_1 \sqrt{DP_{c1}}}{\rho_c} = \frac{K_2 \sqrt{DP_{c2}}}{\rho_c}$$

$$K = \frac{K_2}{K_1}$$

wherein F represents the gas flow rate of the mass flow rate controller, K represents the calibrated coefficient, $DP_{c1}$ and $DP_{c2}$ represent respectively the first and the second differential pressure values of the first and the second differential pressure gauges, $K_1$ and $K_2$ represent respectively first and second coefficients of the first and the second differential pressure gauges, and $\rho_c$ represents a gas density of the variable gas source.

13. The method according to claim 12, wherein calculating the flow rate ratio of the first branch stream to the main stream in real time with the measured differential pressures comprises:
calculating a flow rate ratio of the first branch stream to the main stream using the following equations:

$$RR = \frac{K_2}{K_1} \times \frac{\sqrt{DP_2}}{\sqrt{DP_1}} = K \times \frac{\sqrt{DP_2}}{\sqrt{DP_1}}$$

wherein RR represents the flow rate ratio, $DP_1$ represents the differential pressure of the main stream and $DP_2$ represents the differential pressure of the first branch stream.

14. The method according to claim 10, wherein the controlling device comprises a controller and an adjustable valve for adjusting a flow rate, wherein controlling a flow rate of at least one of the first branch stream and the second branch stream in real time with the compared result comprises:
the controller sending out a control signal to the adjustable valve based on an error between the target flow rate ratio and the calculated flow rate ratio; and
the adjustable valve receiving the control signal from the controller and adjusting its opening position to control a flow rate of at least one of the first branch stream and the second branch stream.

15. A system for controlling a recycle flow rate ratio, comprising:
a fuel cell comprising an anode for generating a tail gas, the anode comprising an inlet and an outlet;
a fuel reformer for mixing a fuel with the tail gas from the outlet of the fuel cell to generate a reformed stream, wherein the reformed stream is split into a first branch stream and a second branch stream at a splitting position, and the first branch stream is returned to the inlet of the anode of the fuel cell for power generation;
a cooler for removing heat from the second branch stream;
a bottoming cycle including an external or internal combustion engine driven in response to the cooled second branch stream;
a measuring device for measuring differential pressures of two of the main stream, the first branch stream and the second branch stream; and
a controlling device for controlling a flow rate ratio of the first branch stream to the main stream in real time in response to the measured differential pressures, wherein the measuring device comprises first and second differential pressure gauges, the first differential pressure gauge is located between the upstream device and the splitting position for measuring a differential pressure of the main stream, and the second differential pressure gauge is located between the first downstream device and the splitting position for measuring a differential pressure of the first branch stream.

* * * * *